Figure 1:
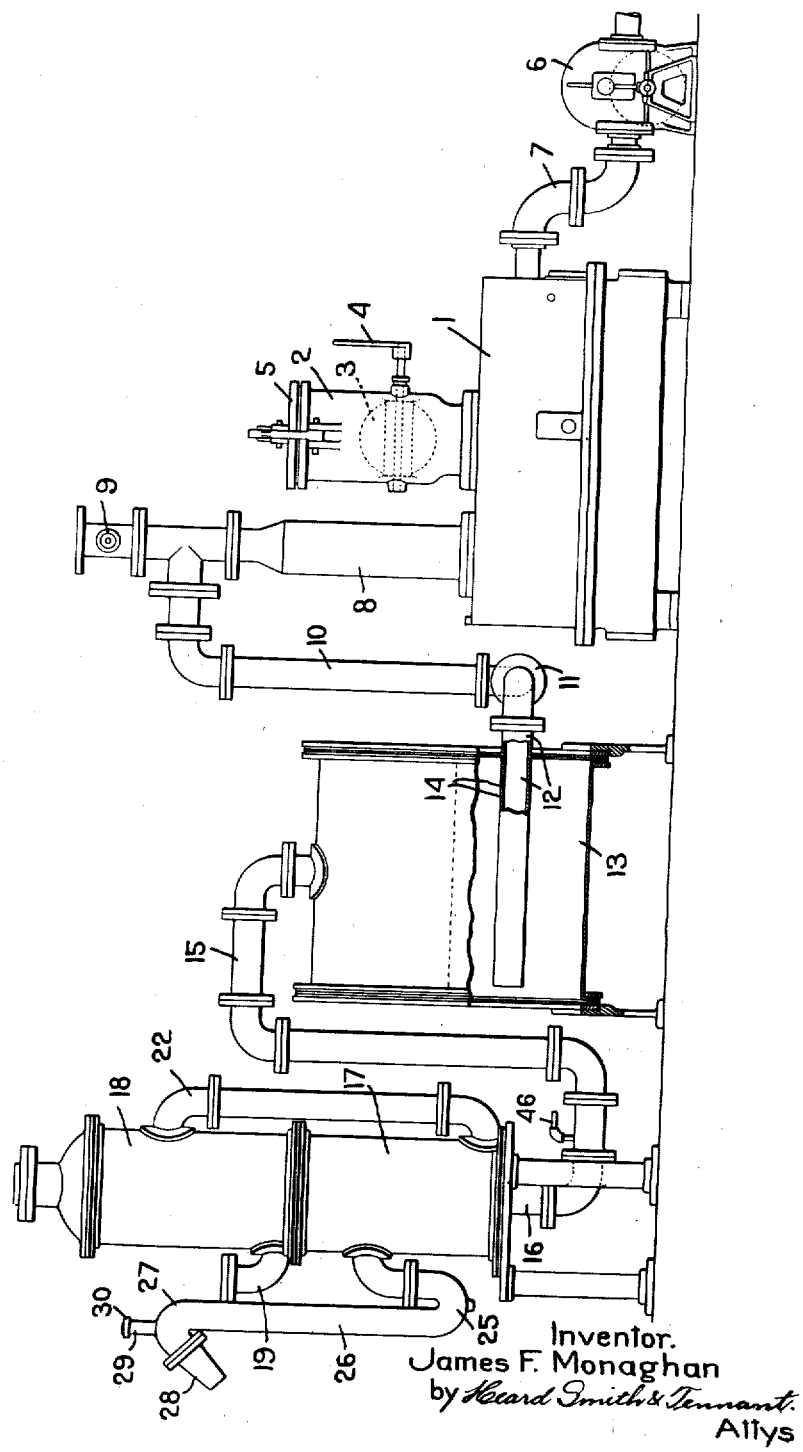

Jan. 11, 1927.

J. F. MONAGHAN 1,614,313

APPARATUS AND PROCESS FOR CONDENSING SOLUBLE GASES

Filed March 17, 1922    2 Sheets-Sheet 1

Inventor.
James F. Monaghan
by Heard Smith & Tennant.
Attys

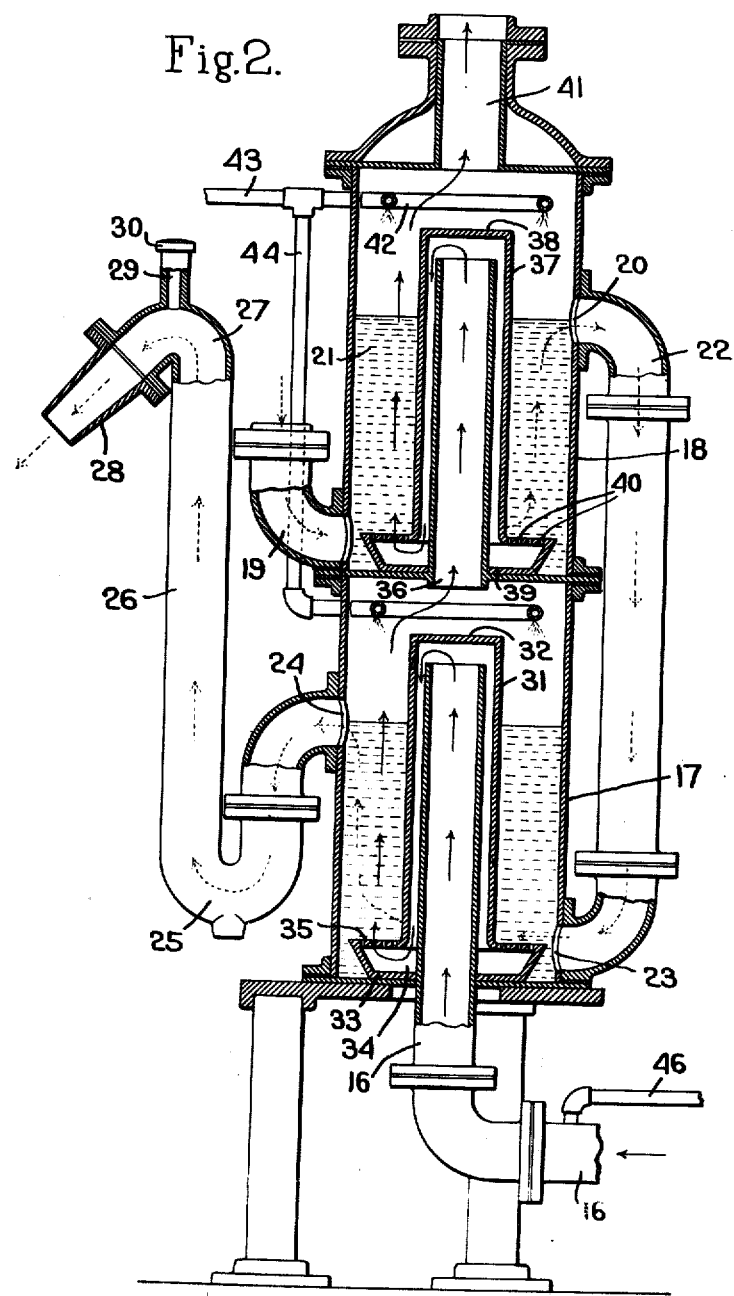

Patented Jan. 11, 1927.

UNITED STATES PATENT OFFICE.

JAMES F. MONAGHAN, OF WALTHAM, MASSACHUSETTS.

APPARATUS AND PROCESS FOR CONDENSING SOLUBLE GASES.

Application filed March 17, 1922. Serial No. 544,473.

This invention relates to improvements in apparatus and process for condensing a soluble gas in a suitable liquid solvent and the principal object of the invention is to provide a simple and efficient means for dissolving gas in a liquid to produce a useful commercial product.

More specifically, the invention comprises a process and apparatus for producing sulphurous or sulphuric acid by dissolving sulphur dioxide in water, and in the production of sulphuric acid by the addition thereto of sufficient oxygen to change the sulphurous acid into sulphuric acid. It will, however, be understood that the process and apparatus in its broader aspect is not limited to treatment of sulphur dioxide, but is adapted to the treatment of any gas the properties of which enable either the process or apparatus to be employed.

In its broad aspect the process consists in condensing a soluble gas by passing the gas through a series of columns of a continuously flowing solvent liquid in a direction counter to the general direction of the flow of the liquid through the series of columns. Preferably, however, the gas is passed through one or more of the columns of liquid in the direction of the current of the liquid in such column, thus facilitating the distribution and effective absorption of the gas during its passage through the column.

A further object of the invention is to provide means for commercially manufacturing sulphurous or sulphuric acid from the sulphur dioxide which forms the product of combustion of sulphur burned in a current of air under pressure.

Other objects and features of the invention will more fully appear from the following description and the annexed drawings and will be pointed out in the claims.

A preferred and novel form of apparatus for performing the process above briefly described is illustrated in the accompanying drawings, in which, Fig. 1 is an elevation of the apparatus, a portion of the washer being broken away, and one of the delivery pipes, which extend into the same, shown partly in section;

Fig. 2 is a longitudinal vertical sectional view through the principal portions of the condensers in which the gas is dissolved in a suitable solvent liquid.

The apparatus comprises broadly a plurality of condensing chambers arranged in series having means for continuously passing a solvent liquid through said series and for maintaining a column of liquid in each of said chambers, means being provided for passing a current of gas through the series in a direction counter to the general direction of the flow of liquid through the series of condensing chambers, the construction preferably being so arranged that the gas will flow through one or more of the columns of liquid in the condensing chamber in the same direction as that of the current of liquid in said column. The gas may be generated in any suitable manner and forced through the condensers under pressure by any suitable means.

In the selective embodiment of the invention disclosed herein an apparatus designed for the production and treatment of sulphur dioxide to produce sulphurous or sulphuric acid is illustrated. It will be understood that this apparatus may be used for the treatment of other chemicals and that so far as the production of the gas, and the means for delivering the same under pressure to the condensers, is concerned any suitable apparatus may be employed.

In the present illustration the condensers are shown as being superimposed for convenience in construction and economy in space, but it will be understood that the condensers may, if desired, be made separately and connected together by suitable conduits to perform the function in a suitable manner, which will be obvious to those skilled in the art, without departing from the spirit of the present invention.

The particular embodiment of the invention illustrated herein comprises a furnace 1 having a hopper 2 to which the material, from which the gas to be produced, may be introduced. The hopper 2 desirably is provided with a butterfly valve 3 operable by a handle 4 to dump the contents of the hopper into the furnace. A cover 5 is provided which may be removed to permit the introduction of the material, such as sulphur or iron pyrites, into the hopper when the butterfly valve is closed. Air is supplied to the furnace by a fan blower 6, the outlet conduit 7 of which leads directly into the furnace. The sulphur dioxide which is produced by the combustion of the sulphur contents of the material introduced into the furnace, together with the unconsumed ingredients of the air which is introduced by the blower, are discharged from the furnace through a pipe 8 which preferably is provided at its top with a valve 9 which may be opened when it is desired to prevent the gases from passing through the condensers. By thus supplying the furnace with air under pressure the supply of air may be so regulated as to provide substantially the exact amount of oxygen required to produce the desired gaseous product and to prevent the production of undesirable products. For example, in the production of sulphurous acid the proper amount of oxygen may be provided to produce sulphur dioxide and the production of sulphur trioxide avoided and thereby preventing the production of sulphuric acid. By opening the valve 9, or by shutting off the supply of air through the blower, the combustion in the furnace may be partially or wholly arrested. In the normal operation of the device the valve 9, however, remains closed and the gases from the furnace pass through a pipe 10 and a tee 11 into a pair of preferably parallel pipes 12, one of which is shown, into the lower portion of a washer 13. The pipes 12 enter the washer well beneath the surface of the liquid therein and the gas is delivered through suitable perforations 14 in the pipes and passes upwardly therefrom through the liquid into the upper portion or dome of the washer. Any sublimed sulphur, or other solid material, which passes over with the gas is thus washed out of the gas. Of course, a certain amount of the gas may at first be absorbed by the liquid in the washer, but the solution will soon become saturated and thereafter the washed gas will be delivered without further absorption.

The washer is in the form of a closed chamber having a delivery pipe 15 which leads through suitable tees and connections to an inlet pipe 16 which delivers the gas to the condensers. The preferred forms of condensers which are illustrated herein comprise a plurality of preferably cylindrical chambers 17 and 18, the upper condenser 18 being superimposed upon the condenser 17. These condensers may, however, be made separately and connected in the manner hereinafter described. While two condensers are illustrated it will be obvious that a greater number of condensers may thus be arranged in series and the gas passed progressively through said series of condensers, in a manner which will hereinafter be more fully described.

The solvent liquid for the gas, which in the treatment of sulphur dioxide for the purpose of producing sulphurous or sulphuric acid is water, is supplied through an inlet pipe 19 which communicates with the upper condenser 18 at or adjacent the bottom thereof, it being understood that the upper condenser is the last of the series of condensers through which the gas is forced. The liquid is discharged from the upper or last condenser through a port 20 which is located at a considerable distance above the bottom of the condensing chamber, so that a column of liquid 21 is constantly maintained in the condensing chamber as the liquid is supplied continuously thereto.

A conduit 22 leads from the port 20 of the upper or last condensing chamber to an inlet port 23 of the condenser 17 upon which the condenser 18 is superimposed, or if the condensers are not arranged in superimposed position, to the next preceding condenser of the series through which the gas is passed.

The outlet 24 for the condenser 17 is located at a distance above the bottom of the condenser and the liquid desirably is discharged therethrough into a trap 25 of an outlet pipe 26, the upper bend 27 of which desirably is substantially at the normal level at which the liquid is maintained in the upper condenser. The pipe 26 may be provided with a fitting 28 to which a hose or other suitable connection may be attached for conveying away the solution.

The upper bend 27 of the pipe 26 desirably is provided with an upwardly extending tube 29 having a cap 30, this upwardly extending tube and cap being provided in order that the cap may be removed to prevent syphonic action of the discharging liquid from the condensers when desired.

By reason of this construction a column of liquid is maintained in each of the condensing chambers and the liquid which is discharged from the upper portion of an upper condensing chamber enters the next lower condensing chamber and finally is discharged from the lowermost chamber or first of the series of chambers. Consequently, the flow of liquid through the series of condensing chambers is in the reverse direction to the current of gas which is passed through said chamber. The flow of liquid, however, in each of the columns is in the same direction as the flow of the gas as will hereinafter more fully appear.

The inlet pipe 16 for the gas desirably extends centrally upwardly into the lower condensing chamber 17 a considerable distance and is enclosed by a tubular member 31 having a closed upper end 32 located above the level of the liquid in said chamber and an enlarged base portion 33 which rests upon the bottom of the condensing chamber 17. This enlarged portion provides a preferably annular chamber 34 the upper wall 35 of which preferably is flat and extends laterally from the body of the tubular member 31. This horizontal wall 35 is provided with a series of preferably uniformly disposed apertures through which the gas is forced into the lower end of the column of liquid in the lower condensing chamber. It will be noted that the direction in which the gas passes through this column of liquid is the same as the direction of the current of liquid in the condensing chamber for the reason that the liquid is introduced at the bottom and is discharged at a considerable distance above the bottom of the condenser. The gas in passing downwardly through the narrow space between the pipe 16 and the enclosing tubular member 31 is cooled by the liquid surrounding the tubular member 31 thereby facilitating its absorption in the liquid.

The gas which passes through the liquid in this condenser escapes into a pipe 36 which extends well up into the superimposed condensing chamber 18. The pipe 36 is enclosed in a tubular member 37 like the tubular member 31. This tubular member is provided with a closed upper end 38 located above the level of the liquid in said chamber and with an enlarged base 39, the upper wall of which is provided with a series of perforations 40 through which the gas is discharged into the lower portion of the column of liquid 21 in the upper condensing chamber. The gas which escapes from the liquid in this upper condensing chamber passes through an outlet pipe or stack 41 to the atmosphere.

It will be noted that, by reason of the fact that the upper ends of the tubular members 31 and 38 extend above the outlets 24 and 20 of the respective chambers, the liquid is prevented from escaping from said chambers if the operation of the device is stopped and that the volume of liquid in a partial state of completion is retained in each chamber, so that upon again starting the apparatus an immediate delivery of acid is resumed.

While but two condensers, arranged in series, are shown in the illustrative embodiment of the invention disclosed herein, it will be understood that a series may comprise any desirable number of condensers arranged in superimposed relation or otherwise.

By reason of the fact that the gas is introduced under pressure at or near the bottom of the column of liquid solvent in the respective condensers and passed upwardly through said column in the direction of the flow of the water in said column, the density of the body of liquid will become rarefied by the progressive expansion of the rising gas bubbles in direct proportion to the increase of distance from the bottom of the column until the normal level of the solution is reached, where the gas emerging from the liquid will produce such an agitation of the liquid that the latter will be blown into the form of a spray or vapor which practically fills the end portion of the condenser chamber above the normal level of the liquid. This spray or vapor of the solvent liquid thus produced rapidly absorbs the gas which emerges from the liquid column.

It will be noted that the solvent liquid flows by gravity through the series of condensers so that by suitably controlling the rate of supply it may be caused to remain in the condensers a sufficient time to enable it properly to absorb the gas. By properly regulating the rate of flow of the liquid in relation to the flow of gas under pressure practically any desired strength of resulting solution may be obtained.

In order to insure a more complete reclamation of the soluble gas which it is desired to recover from the gases which pass through the condensers a spray of the liquid may be projected into the gas as it rises from the surface of the column or columns of liquid in the condensers. As illustrated herein an annular perforated pipe 42 is located in the upper portion of the upper condenser and is supplied with liquid from an inlet pipe 43. A branch 44 of said inlet pipe may also be provided to deliver the liquid to a similar perforated pipe 45 located in the upper portion of the lower condensing chamber 17.

In the operation of the device when employed for the production of sulphurous acid, the sulphur dioxide is generated in the furnace as above described and is passed under pressure through the pipe 16 into the tubular member 31 from which it is delivered through the apertures 35 in the enlarged base portion into the lower portion of the column of water in the lower condenser. The greater part of the sulphur dioxide is thus absorbed in this condenser. That which passes through the column of water in the lower condenser is conducted through the pipe 36 and tubular member 38 to the chamber 39 in the base of said tubular member from which it escapes through the apertures 40 into the lower portion of the column of water in the upper condenser, and passing through this column of water is practically entirely absorbed for the reason that the water which is contained in the upper condenser is practically free of gas and, therefore, capable of more rapidly absorbing the sulphur dioxide.

As the gas passes from the upper condenser to the air the pressure upon the surface of the column of liquid 21 in the upper condenser is the normal atmospheric pressure. The pressure upon the column or columns of water in the lower condenser or condensers, however, will be in excess of atmospheric pressure corresponding to the height of the water column above the surface of the column in any of these condensers.

By correlating the flow of gas and solvent liquid through the condensers the strength of the solution delivered from the apparatus may be duly regulated so that a solution may be delivered from the apparatus suitable for employment in bleaching and other commercial uses. By reason of the fact that all the sublimed sulphur, and other foreign material, has been eliminated from the gas by the washer staining of the goods which are to be bleached and other injurious effects upon the product to be treated are avoided.

Should any of the gas escape from the surface of the upper condenser it is treated with a spray from the pipe 42 so that practically all of the sulphur dioxide is extracted before the remaining gases escape from the stack 41. The spray of water which is introduced through the pipe 45 in the lower condenser likewise aids in more thoroughly absorbing the gas which is to be recovered, but the introduction of water or other liquid in this lower condenser necessarily weakens the solution which is delivered from the condensers and consequently may be omitted if desired.

Where it is desired to produce sulphuric acid instead of sulphurous acid an oxidizing agent may be introduced into the sulphur dioxide gas before it enters the lowermost condenser or first of the series. This may be accomplished by introducing an oxidizing agent, such as, oxygen, or nitrous oxide, into the pipe 16 at any convenient point as through a pipe 46 which leads from a suitable generator to the pipe 16.

When an additional oxidizing agent is thus introduced the sulphur dioxide is transformed into the sulphuric radical and being dissolved in the water produces sulphuric acid.

It has been mentioned that the present apparatus and process may be employed for the treatment of other gases. As a specific instance it may be mentioned that bisulphite of soda ($NaHSO_3$) may be produced in a similar manner by passing sulphur dioxide gas ($SO_2$) through a solution of sodium carbonate ($NaCO_3$) in the manner above described. Similarly other products may be treated by the same process and apparatus by forcing the selected gas through a suitable solvent. It will, therefore, be understood that the embodiment of the invention disclosed herein is of an illustrative character and is not restrictive and that various modifications may be made in construction and arrangement of the parts and details of the apparatus and of the order of treatment of the gas within the spirit and scope of the following claims.

Having thus described my invention, what I claim as new, and desire to secure by Letters Patent, is:

1. An apparatus for condensing a soluble gas comprising a series of condensing chambers each providing a reservoir for a column of suitable solvent liquid, means for producing a current of liquid through said series including means for introducing the liquid into the respective chambers at or adjacent to the bottom thereof, means for maintaining a constant level of liquid in each chamber, means for forcing the gas progressively through the columns of liquid in said chambers under a pressure greater than atmospheric pressure and means in one or more of said chambers for projecting a spray of liquid upon the gas which rises through the column of liquid in such chamber or chambers.

2. An apparatus for condensing a soluble gas comprising a plurality of superimposed condensing chambers arranged in series including means for supplying a continuous current of suitable solvent liquid to the uppermost chamber at or adjacent the bottom thereof, a conduit communicating with the superimposed chamber at the maximum level of the liquid, said conduit also communicating with the next lower condensing chamber of the series at or near the bottom thereof, means for delivering the liquid from the lowermost condensing chamber at the maximum level of the liquid therein, means for forcing the gas into the column of liquid in the lowermost chamber at or adjacent the bottom thereof, including a conduit for said gas having a member extending above the maximum level of the liquid in said chamber, means for progressively delivering the gas which rises through the column of liquid in a lower condensing chamber into the column of liquid in the next superimposed chamber adjacent the bottom thereof including a conduit for said gas having a member extending above the maximum level of the liquid in said chamber, and means in the upper portion of one or more of said condensing chambers for delivering a spray of the liquid into the gas rising through the column of liquid in said chamber.

3. An acid generator comprising means for generating sulphur dioxide under pressure, a washer, means for progressively passing said sulphur dioxide under pressure through said washer, a plurality of condensers, arranged in series, communicating with said washer, means for passing a current of water progressively through said condensers and for maintaining a column of water in each condenser, whereby the gas produced by said generator will be forced progressively through the columns of water in said condensers under the pressure of said generator in a direction counter to the general direction of the passage of water through said series and through the columns of water in said condensers in the direction of the flow of the water in the respective condensers.

4. An acid generator comprising means for generating sulphur dioxide, a plurality of condensers, arranged in series, connected to said generator, means for passing a current of water progressively through said condensers and for maintaining a column of water at a substantially constant level in each condenser, means for forcing the gas produced by said generator, progressively through the columns of water in said condensers in a direction counter to the general direction of the passage of water through said series and means for delivering a spray of water in one of said condensers in a direction opposite to the flow of gas rising from the water in said condenser.

5. An apparatus for producing sulphurous acid comprising a closed furnace, means for supplying a sulphurous composition to said furnace, means for supplying said furnace with air under pressure, a water-containing condenser, and means for conducting the sulphur dioxide produced in said furnace under the pressure in the furnace into the liquid in said condenser comprising a conduit extending through the liquid in said condenser and arranged to discharge said sulphur dioxide into the water in proximity to the bottom of the condenser whereby the water of the condenser will act as a cooling agent to reduce the temperature of said sulphur dioxide.

6. An apparatus for condensing a soluble gas comprising a condenser having a chamber for a liquid, an inlet, an outlet for said liquid determining the maximum level of the liquid in said chamber, means for introducing the soluble gas into said liquid including a pipe extending upwardly through the bottom of said chamber substantially to the maximum level of the liquid and a distributing member enclosing said pipe and resting on the bottom of said condenser having means for delivering the gas into the liquid in close proximity to the bottom of said chamber and substantially uniformly therethrough.

7. The process of producing refined sulphurous acid which consists in burning a sulphurous composition in a furnace in the presence of air supplied to said furnace under pressure greater than atmospheric pressure, washing the products of combustion while under said pressure and causing the purified sulphur dioxide to pass under the said pressure produced by the air pressure in the furnace through a continuously flowing column of water in the same direction as the direction of flow of the water in said column.

8. The process of condensing a soluble gas which consists in passing the gas under a pressure greater than atmospheric pressure through a series of columns of a continuously moving solvent liquid in a direction counter to the general direction of the flow of such liquid through said series of columns and subjecting the gas to a spray of the solvent liquid upon its emergence from a column of the liquid.

9. The process of producing an acid which consists in passing sulphur dioxide through a washer and then progressively through a condenser comprising a series of columns of continuously flowing water in a direction counter to the general direction of the flow of said water through said series and adding an oxidizing agent to said sulphur dioxide after it leaves the condenser and before it enters the water.

10. The process of condensing a soluble gas which consists in passing through an ascending column of liquid, soluble gas flowing in the same direction as the solvent under sufficient pressure to cause the body of the liquid to be progressively rarefied by the expansion of the bubbles of gas ascending with the liquid and the surface of the liquid to be blown into a spray capable of more effectively absorbing the undissolved gas which passes through the column of the solvent.

In testimony whereof, I have signed my name to this specification.

JAMES F. MONAGHAN.

flow of the water in the respective condensers.

4. An acid generator comprising means for generating sulphur dioxide, a plurality of condensers, arranged in series, connected to said generator, means for passing a current of water progressively through said condensers and for maintaining a column of water at a substantially constant level in each condenser, means for forcing the gas produced by said generator progressively through the columns of water in said condensers in a direction counter to the general direction of the passage of water through said series and means for delivering a spray of water in one of said condensers in a direction opposite to the flow of gas rising from the water in said condenser.

5. An apparatus for producing sulphurous acid comprising a closed furnace, means for supplying a sulphurous composition to said furnace, means for supplying said furnace with air under pressure, a water-containing condenser, and means for conducting the sulphur dioxide produced in said furnace under the pressure in the furnace into the liquid in said condenser comprising a conduit extending through the liquid in said condenser and arranged to discharge said sulphur dioxide into the water in proximity to the bottom of the condenser whereby the water of the condenser will act as a cooling agent to reduce the temperature of said sulphur dioxide.

6. An apparatus for condensing a soluble gas comprising a condenser having a chamber for a liquid, an inlet, an outlet for said liquid determining the maximum level of the liquid in said chamber, means for introducing the soluble gas into said liquid including a pipe extending upwardly through the bottom of said chamber substantially to the maximum level of the liquid and a distributing member enclosing said pipe and resting on the bottom of said condenser having means for delivering the gas into the liquid in close proximity to the bottom of said chamber and substantially uniformly therethrough.

7. The process of producing refined sulphurous acid which consists in burning a sulphurous composition in a furnace in the presence of air supplied to said furnace under pressure greater than atmospheric pressure, washing the products of combustion while under said pressure and causing the purified sulphur dioxide to pass under the said pressure produced by the air pressure in the furnace through a continuously flowing column of water in the same direction as the direction of flow of the water in said column.

8. The process of condensing a soluble gas which consists in passing the gas under a pressure greater than atmospheric pressure through a series of columns of a continuously moving solvent liquid in a direction counter to the general direction of the flow of such liquid through said series of columns and subjecting the gas to a spray of the solvent liquid upon its emergence from a column of the liquid.

9. The process of producing an acid which consists in passing sulphur dioxide through a washer and then progressively through a condenser comprising a series of columns of continuously flowing water in a direction counter to the general direction of the flow of said water through said series and adding an oxidizing agent to said sulphur dioxide after it leaves the condenser and before it enters the water.

10. The process of condensing a soluble gas which consists in passing through an ascending column of liquid, soluble gas flowing in the same direction as the solvent under sufficient pressure to cause the body of the liquid to be progressively rarefied by the expansion of the bubbles of gas ascending with the liquid and the surface of the liquid to be blown into a spray capable of more effectively absorbing the undissolved gas which passes through the column of the solvent.

In testimony whereof, I have signed my name to this specification.

JAMES F. MONAGHAN.

CERTIFICATE OF CORRECTION.

Patent No. 1,614,313. granted January 11, 1927.

to JAMES F. MONAGHAN.

It is hereby certified that error appears in the printed specification of the above mentioned patent requiring correction as follows: Page 4, line 76 and 77, claim 1, strike out the words "under a pressure greater than atmospheric pressure"; and that the said Letters Patent should be read with this correction therein that the same may conform to the record of the case in the Patent Office.

Signed and sealed this 22nd day of February, A. D. 1927.

M. J. Moore,
Acting Commissioner of Patents.

Seal.

CERTIFICATE OF CORRECTION.

Patent No. 1,614,313.                                              granted January 11, 1927.

to JAMES F. MONAGHAN.

It is hereby certified that error appears in the printed specification of the above mentioned patent requiring correction as follows: Page 4, line 76 and 77, claim 1, strike out the words "under a pressure greater than atmospheric pressure"; and that the said Letters Patent should be read with this correction therein that the same may conform to the record of the case in the Patent Office.

Signed and sealed this 22nd day of February, A. D. 1927.

Seal.

M. J. Moore,
Acting Commissioner of Patents.